July 30, 1929.  W. HARPER, JR  1,722,257
ROTARY RECIPROCATING COMBUSTION ENGINE
Original Filed Dec. 1, 1920   4 Sheets-Sheet 3

Patented July 30, 1929.

1,722,257

UNITED STATES PATENT OFFICE.

WILLIAM HARPER, JR., OF NEW BLOOMFIELD, PENNSYLVANIA, ASSIGNOR, BY MESNE ASSIGNMENTS, TO AMERICAN GAS TURBINE CORPORATION, OF NEW YORK, N. Y., A CORPORATION OF DELAWARE.

ROTARY RECIPROCATING COMBUSTION ENGINE.

Application filed December 1, 1920, Serial No. 427,475. Renewed April 24, 1926.

This invention relates to improvements in combustion engines of the rotary reciprocating type, and has for its objects to provide a balanced multicylinder rotary engine of fairly high speed which will be suitable for use as a small portable motor for boats, household machinery, etc., and also in larger size for detached lighting plants, pumps, etc., and generally in situations where electric motors are commonly used today. An advantage of electric motors is that they are balanced and hence do not require heavy foundations to prevent shaking to pieces and can be operated at economical high speed. At the present time there are practically no lighting installations driven by balanced high speed combustion engines, as the detached lighting installations now on the market usually have a slow speed engine which requires a heavy foundation and even then must be at a distance from the house, owing to noise and vibration, together with a heavy, specially designed slow speed generator. With the engine of this invention, it is possible to eliminate the expense of heavy foundations and also to use a much more economical and lighter form of high speed generator, thereby effecting a considerable saving in cost of installation. Heretofore, as far as I am aware, rotary reciprocating engines have had a limited use in aviation, wherein economy of fuel and oil has not been considered but for the purposes above specified these considerations are material.

A further object of the invention is to provide a cross firing arrangement whereby electric or other ignition is only required in starting, the engine being so constructed that after once being started the flame from one cylinder during the working stroke will be admitted to the next cylinder to fire, thus dispensing with the necessity of a magneto or other source of current for continuous spark ignition.

A still further object of the invention is to provide a low speed rotary valve mechanism which is preferably located within a rotary shaft carrying the cylinders, the inlet of gas being at one end and the exhaust at the other, the intermediate portion of the rotary valve carrying the cross ignition passage and the valve also carrying in the preferred form herein shown, a satisfactory form of make and break ignition for starting.

A further object of the invention is to provide a water cooled engine wherein a pump will be eliminated, by utilizing the centrifugal force of the cylinders to circulate water owing to the difference in density between hot and cold water, the cold water tending to flow outward and the hot water inward, suitable passages being provided so that this circulation can go on continuously.

Further objects of the invention include means for varying the timing and the general arrangement and construction of parts whereby unusual compactness and lightness are obtained, with simplicity of construction.

The engine comprises generally a frame or casing, resembling that of an electric motor on which is journaled a hollow shaft to which is keyed the radial cylinder casting, the cylinder heads being adjacent the shaft and having ports registering with ports in the shaft, and within the shaft being a differentially driven inlet and exhaust valve mechanism, the cross firing connections, the starting ignition system and also the water connections. The pistons reciprocate in the cylinders, the outer ends of which are open, by means of fixed eccentrics carried by the frame, carrying a peculiar form of yoke connecting rod, the entire engine acting on the four cycle principle and preferably having an odd number of cylinders, which enables the valve to be driven slower than the shaft and to properly control the cylinders with a less number of ports. The five cylinder engine herein illustrated is operated by a valve having three inlet and three exhaust ports and three cross firing ports, means being provided for shifting the valve relatively to the cylinder ports to change the timing.

In the accompanying drawings.

1 represents the base of the motor which is preferably made in two halves as shown, and secured together by bolts through holes 2. Each frame half is provided with vertical walls 3 between which are the diverging cylinders 4 which are keyed on a shaft 5 which shaft is journaled in the frame on bearings 6, so that the shaft and cylinders rotate as a unit. Each cylinder is provided with a combustion space and gas port 7 at the inner end registering with shaft port 8 and reciprocating radially in each cylinder are pistons 9 having at their outer ends studs 10 on which are yokes 11 having T shaped feet 12 which bear on stationary divided eccentric rings 13 carried by the frame, so that each piston makes a complete reciprocation during 180° revolution of the cylinders. As shown in the drawings, the cylinders are slotted as at 14 to allow the studs 10 to slide therein, but the elongated feet 12 insure ample bearing space on the rings 13 bearing on eccentric 18, the cylinder unit thus being driven by the yokes 11.

Figure 1:
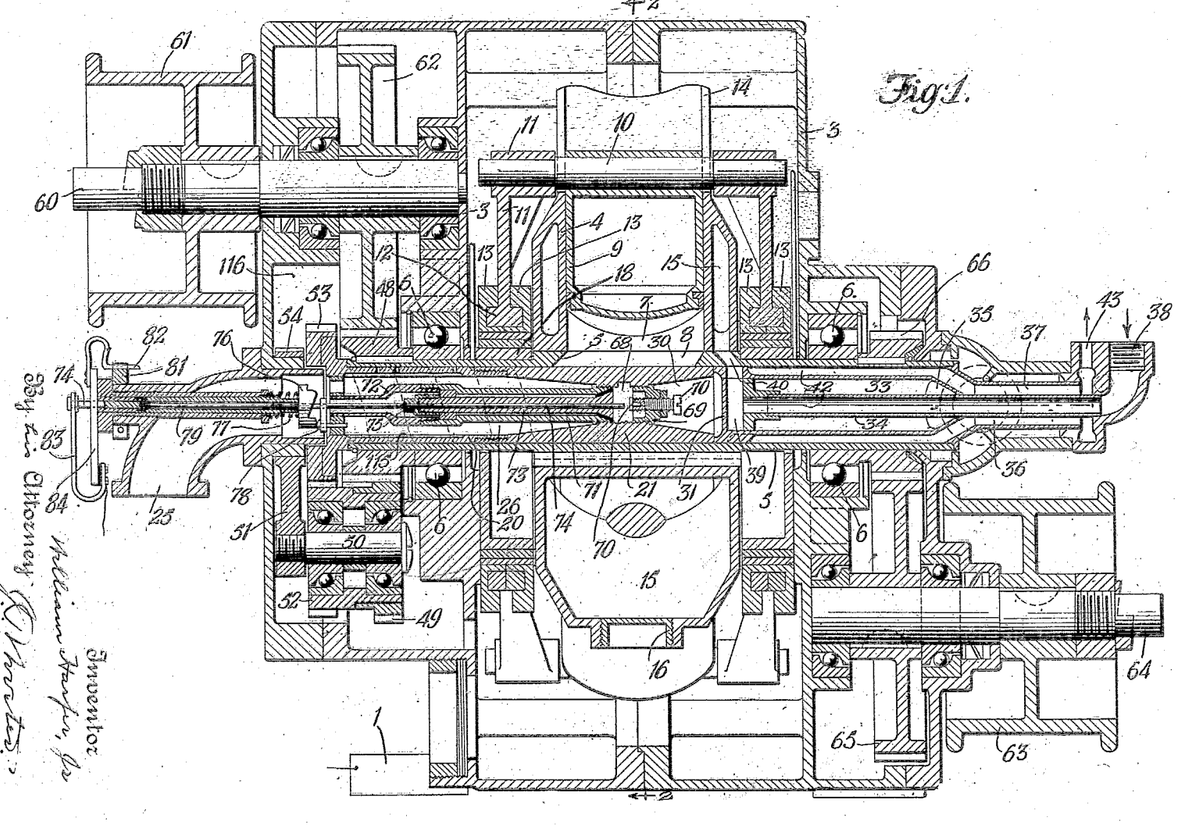
Figure 1 is an elevation in section of the engine.
Figures 2, 3, 4, 5:
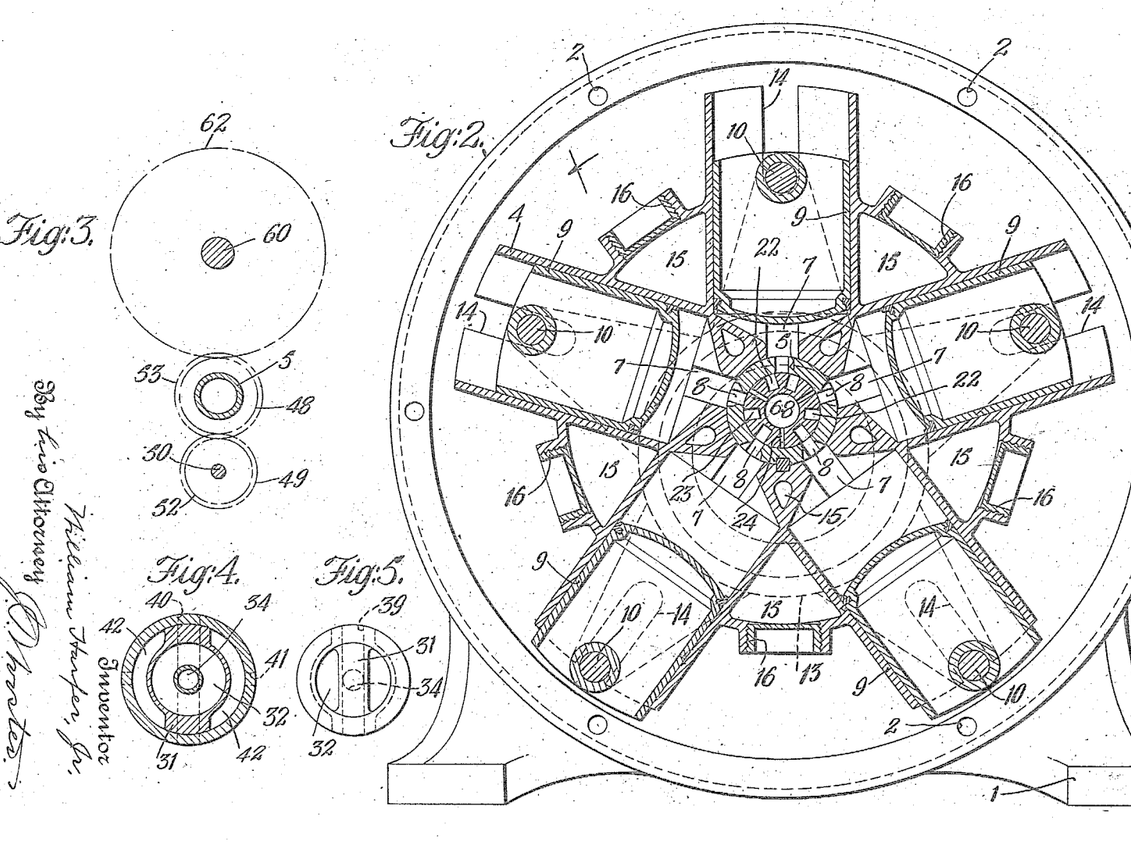
Figure 2 is a sectional elevation on the line 2—2 of Figure 1.
Figure 3 is a detail of the shifting mechanism for varying the valve timing.
Figures 4 and 5 are detail sections showing arrangements of the valve at the exhaust end to enable it to pass the exhaust gases and incoming and outgoing cooling passages.
Figure 7:
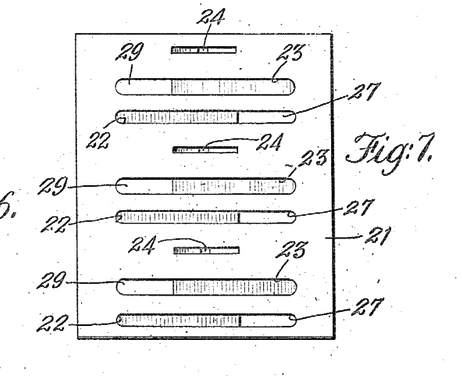
Figure 7 is a development of a valve showing the port arrangements.
Figure 8:
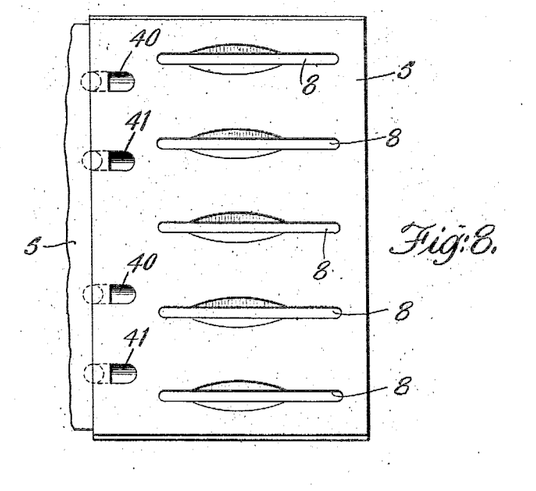
Figure 8 is a development of the shaft showing the cylinder ports and water inlets.

The diverging cylinders of the rotor are cast in the form of a unitary casting resembling a wheel without a rim, the casting being cored to provide the water jacket 15 with plugs 16 as shown in Figure 2. The only finishing operations necessary besides balancing the casting and boring the cylinders is to bore the center to receive the shaft and the shaft key way, together with the tapping for the plugs 16. The valve mechanism for both inlet and exhaust, and cross firing is herein shown in one element, all connecting at proper times with the single cylinder and shaft ports 7—8, but in the broad aspects of the invention other forms of valve mechanism may be used. 20 is a valve tube carrying the port section 21, shown developed in Figure 7 wherein 22 are inlet ports, 23 exhaust ports and 24 cross firing ports, these ports being angularly spaced about as shown, the development of Figure 7 representing 360° of revolution. The gas inlet is by pipe 25 at the left end into the passage 26 and thence by undercut opening 27 to the shaft port 8 and then to the cylinder port 7, while the exhaust from the cylinder is through cylinder port 7, shaft port 8, opening 29 to exhaust space 30 in the center of the valve thence around T head 31 through passages 32 into the exhaust gas passage 33 surrounding the water inlet 34, the gas discharging through divided passages 35 into the gas exhaust manifold 36 shown behind the water inlet tube 34 and the water outlet tube 37 in Figure 1. Water comes in at pipe 38 through pipe 34 thence to T head passage 39 in T head 31 thence through shaft water inlet ports 40 into the jacket 15, the cold water being centrifugally thrown outward and the hot water flowing inwardly from the jacket through shaft ports 41 to the water outlet passage 42 within the shaft, thence by passage 37 to the water outlet 43. At 40 in Figure 1 is shown how both ports 40—41 in the shaft are diagonally undercut so that the water can pass as described.

By rotating the valve differentially relatively to the cylinder ports, which in the instant case is with the shaft ports as well, two outstanding advantages are secured. One is that a less number of valve ports is required than the number of cylinders, it being observed that the valve carries three inlet and three exhaust ports for five cylinders, and another advantage is that the wear of the valve is reduced to a minimum because there is only a slight relative movement between the valve and the shaft. Moreover the reduction of the number of ports in the valve gives ample room for the necessary valve lap, and also furnishes room without cutting down the valve lap, for the three cross firing ports. Consequently a five cylinder engine is operated by a valve with three inlet and three exhaust ports and can also be cross fired by three cross firing ports.

Figures 9, 10:
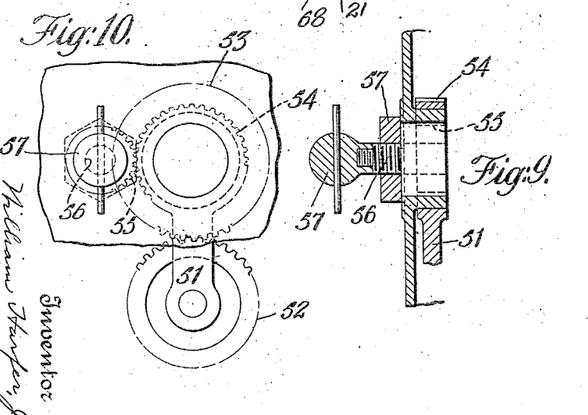
Figures 9 and 10 are further details of the valve timing shift.

The shaft carries a gear 48 keyed thereto which drives a gear 49 mounted on a stud 50 carried by a swinging arm 51 (see Figure 10) gear 49 driving a gear 52 which drives gear 53 on the valve sleeve 20, the gearing being such that the valve is driven ⅙th slower than the speed of rotation of the shaft and cylinders. The arm 51 carries a segment 54 which meshes with the gear 55 on shaft 56 with set nut and handle 57 so that the arm 51 can be angularly swung and held in adjusted position to angularly shift the valve relatively to the shaft to adjust the timing since as shown the gears 48 and 50 are of different size. This engine preferably employs a relatively high compression, with relatively short piston stroke and consequently will develop a high speed if the exhaust valves open at about 120° as will be seen to be the case in Figure 7.

60 represents the starting shaft which also carries a belt pulley 61 by which power may be supplied to or taken from the engine, the shaft 60 having bearings as shown and carrying gear 62 which meshes with gear 48, and at the other end of the motor is another pulley 63 on shaft 64 carrying gearing 65 which meshes with gear 66 on the end of shaft 5.

The starting ignition may be by flame from hot wire, high tension spark, or low tension make and break, or from a catalyst, and I show several of these specially adapted to the peculiar conditions of this invention. At one end of the chamber 68 is a plug 69 carrying an adjustable firing contact 70, and the other end of the chamber is closed by a tube 71 threaded into another tube 72 within the gas inlet passages 26. Within the tube 71 is a tube 73 insulated from tube 71, and within tube 73 is reciprocating firing pin 74 passing through insulating bushing 75 and passing loosely through a stationary cam 76 pressed by spring 77 and cooperating with rotating pin 78 fixed to pin 74. This cam 76 has three notches, and it will be seen that it will periodically connect the contact on the end of firing pin 74, and the end of screw 70 to quickly separate them to produce a spark in chamber 68, owing to the rotation and reciprocation of the pin 78 and pin 74, pin 78 being engaged with the valve through hole (see also Fig. 13) 84' therein so as to be rotated thereby. The cam 76 is loose on rod 74 and is held pressed against pin 78 by spring 77, 79 being a bushing in which the rod 74 can reciprocate. 81 is a segment having teeth with which latch 82 engages for timing the spark, and 83 is a spring mounted on arm 84, which snaps the firing pin 74 back to make the spark. The function of the spring 83 is to snap the rod 74 back to open the contact points to make the spark.

Alternately, masses of combustible gases and exploded gases enter chamber 68 because of the suction, compression, and working strokes, and thus it may be said that a scavenging action is secured for chamber 68. To avoid the quenching effect of ports 24 being too small, or loss of compression if these are too large, a hole 24 of the proper size is made and is then milled out on top at opposite sides of the hole as in Figures 7 and 11 so that the flame can fan out into and through shaft port 8 and cylinder port 7. The cross firing passage is preferably through the valve where it is entirely walled in by the valve. Because the valve is between the cylinders and concentric with the cylinder movement, the passage through the valve is short. The crossfire passage in the valve is heated substantially continuously due to the supply of hot gases during the power stroke of the cylinders, regardless of whether or not the crossfire passage simultaneously connects the firing and fired cylinders.

Figures 6, 6A, 11, 12:
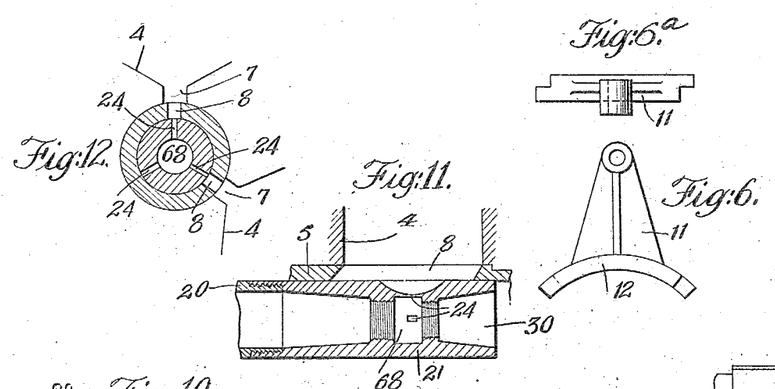
Figures 6 and 6ª are details of the connecting yokes.
Figures 11 and 12 are details showing the cross firing passage construction.

Another feature of novelty in the construction here described resides in the yokes 11 shown in Figures 6ª and 6 which are provided with a broad wearing surface and are notched on opposite sides as shown so that the end of one slightly overlaps the end of the next one, thus allowing practically the entire surface of the eccentric ring to be utilized for bearing surface, thereby reducing wear and preventing canting or distortion due to the varying angles at different piston positions. A novel method of making these yokes is to make up a yoke casting with one yoke less attached to the ring than the engine will require, then sawing the ring into segments and offsetting the ends to overlap and slide together when placed in the T slot. With five yokes, each retaining segment can bear in the T slot for more than 1/4 of the periphery of the T slot, thereby eliminating canting.

Figures 13, 14, 15, 16, 17, 18:
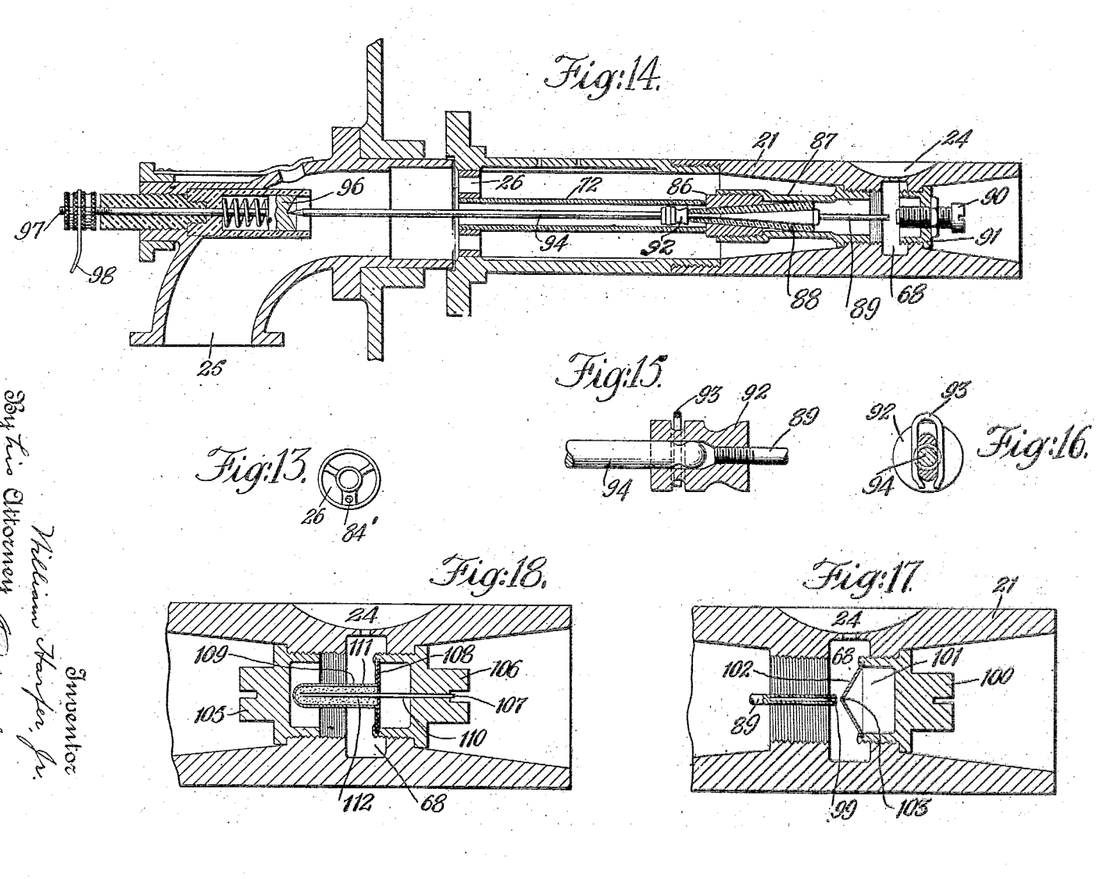
Figure 13 is an end elevation of the supply passage in the valve.
Figure 14 is a view of a modification showing a form of high tension ignition.
Figures 15 and 16 are details of the connection on the ignition rod in Fig. 14.
Figure 17 shows a modification of the ignition device of Figure 14 provided with means for dispersing the spark.
Figure 18 shows a further modified form of spontaneous combustion ignition.

In Figure 14 a form of high tension ignition is shown wherein the tube 72 is straight and abuts against a block 86 carried by tube 87 threaded into the valve 21 and closing the chamber 68 at one end. Mounted in the block 86 is insulation such as wrapped mica 88, carrying the electrode 89, the current jumping to an electrode 90 in plug 91 forming the other end of the ignition chamber 68, with the screw 90 adjustable for length of gap. The electrode 89 is carried by a plug 92 to which is secured by a clip 93, a rod 94 extending outwardly into the charge passage 25 and engaging in a conical spring pressed block 96. This spark plug and all the mechanism associated therewith must turn with the valve so that the cone plug 96 forms a bearing on which the rod 94 turns. From the plug 96 the current goes out through suitable conductors to binding post 97 carrying the conductor 98 from the magneto. The distributor for the magneto will have a commutator with contact segments which will be so spaced as to complete the circuit at the proper times, or else will be driven at such speed with a single segment as to do this. In the present case, the ignition sparks will be produced at about the same times that the cross firing ignition occurs, or the make and break, giving one spark in approximately each 120° of valve revolution.

The rod 94 is connected to the plug 92 by means of a clip 93 which engages in the groove of rod 94 as shown in Figures 15 and 16. A preferable form of high tension ignition electrodes is shown in Figure 17, wherein the rod 89 is counter bored as shown at 99, to form a recess, and the plug 100 carries a chamber 101 which is closed by a conical cover 102 having a small hole 103 in the end registering with the counter bore 99 in the rod 89. The variations in pressure in the chamber 68 cause gas to be blown in and out of chamber 101, the effect of this blast of gas through the hole 103 being to spread or fan out the arc laterally, thus giving a much quicker and better body of gas to be ignited, because of the spreading out of the flame.

The gas pulsating in and out of chamber 101 and counter bore 99 causes the recesses to clear themselves.

In Figure 18 a spontaneous combustion ignition element operating by catalytic action is shown wherein chamber 68 is closed by plugs 105, 106, the latter having a small air passage 107 leading through a plate 108 into the ignition chamber 68. The plate 108 carries a tube 109 composed of platinum and within this is the tube 110 of platinum. The tube 109 has a small hole 111 near its base, the tube 110 being open at both ends as shown. The space between tube 109 and 110 is filled with active catalytic material 112 which may be sponge platinum impregnated with very finely divided platinum together with an oxidizing agent such as thorium or cerium or oxid thereof tending to attract or occlude oxygen from the air. The gas is forced through the small hole 111 in the outer tube 109 through the active material into the tube 110, causing combustion to start and be accelerated by the oxides present, the temperature gradually working up to that of ignition through cellular combustion in the active material 112. The tube 109 thus becomes hot enough to ignite the gas. A small leakage is desired through the tube 107 so that fresh gas will continually be driven into the active material. Owing to the very small mass of the tube 109 it cannot radiate heat very fast and will stay hot. If one cylinder misses fire, this plug will retain sufficient heat to ignite the next cylinder.

The provisions for oiling are largely by centrifugal forces, as this type of engine lends itself especially thereto. As seen in Figure 1 the end of the valve tube is provided with an oil well 115, with holes in the valve through which the oil will be forced to lubricate the bearing between the valve and the shaft, the outer end of the valve having spiral oil grooves as shown in Figure 1. The oil will be supplied to this well by condensation from the space 116 entering well 115 through the space between gear 53 and member 54 and openings 26 in the valve, (see Fig. 14). The cylinders can, of course, revolve in oil and the shaft bearings where not directly supplied by the centrifugal forces can be oiled in the ordinary manner.

This invention is not to be restricted to the five cylinders and three port valve herein shown, as other numbers of cylinders may be used with proper differentiation between angular cylinder velocity and angular valve velocity. Thus a 7 cylinder engine can be operated with a four port valve if driven at 1/8 less angular velocity than the cylinders, but increase in the number of cylinders tends to increase the size and diameter, tending to lengthen the gas travel.

Among the advantages of this invention may be mentioned the provision of a compact symmetrically arranged rotary reciprocating combustion engine so formed as to be capable of being better balanced and therefore freer from vibration and other objections than has heretofore been possible in the prior art. Another advantage of this invention resides in the provision of a differentially rotating valve whereby reduced wear and friction between the valve and shaft results. Inasmuch as a valve of this type is subject to considerable temperature differences, reduction in wear is of substantial value. A further advantage resides in the provision of means for adjusting the timing or the angular relationship between the valve and cylinders, which adjusting means may be controlled while the engine is running or while stationary. Yet a further advantage resides in the provision of means for firing the compressed charge in one cylinder from that in another, while still possessing the aforementioned advantages that accrue to engines having rotary valves.

What I claim is:

1. In a combustion engine having a controlled exhaust, a rotor including diverging cylinders each having a gas port and combustion space at the inner end, a piston in each cylinder, means for reciprocating the pistons during cylinder rotation, a rotary valve concentric with the cylinder movement for controlling the admission of gas to the cylinders, differential means for driving said valve in timed relation to the cylinders and in the same direction, and means for varying the timing of said valve.

2. In a combustion engine having a controlled exhaust, a rotor including diverging cylinders having a gas port and combustion space at the inner adjacent ends, a piston in each cylinder, means for reciprocating the pistons during cylinder rotation, a valve between said cylinders and concentric with their movement for controlling admission of gases to said cylinders, means for driving said valve in timed relation to said cylinders, and means for varying the timing of said valve during rotation.

3. In a combustion engine having a controlled exhaust, a rotor including diverging cylinders having a gas port and combustion space at the inner adjacent ends, a piston in each cylinder, means for reciprocating the pistons during cylinder rotation, a valve between said cylinders for controlling admission of gases to said cylinders, means for rotating said valve in timed relation to said cylinders, and means for varying the timing of said valve including a gear concentric with said valve, a driving gear engaging said first gear, and means for moving the second gear about the first while in mesh therewith to rotate the valve relatively to said cylinders.

4. In a combustion engine having a controlled exhaust, a rotor including diverging cylinders each having a gas port and combustion space at the inner end, a piston in each cylinder, means for reciprocating the pistons during cylinder rotation, a valve concentric with the cylinder movement for controlling the admission of gas to the cylinders, means for rotating said valve in timed relation to the cylinders, and means for varying the timing of the valve comprising a gear on said valve, a gear carried by said cylinders, intermediate gears therebetween driving said valve at a different speed from said cylinders, movable means carrying said intermediate gears, and means for moving said intermediate gears about said cylinder and valve gears while in mesh and during rotation to change the angular relationship between said valve and cylinders.

5. In a combustion engine having a controlled exhaust, a rotor including diverging cylinders each having a gas port and combustion space at the inner end, a piston in each cylinder, means for reciprocating the pistons during cylinder rotation, a rotary valve concentric with the cylinder movement for controlling the admission of gas to the cylinders, means for driving said valve in timed relation to the cylinders, means for varying the timing of said valve while the engine is running.

6. In a combustion engine having a controlled exhaust, a rotor including diverging cylinders each having a gas port and combustion space at the inner end, a piston in each cylinder, means for reciprocating the pistons during cylinder rotation, valve mechanism for controlling the passage of gas to and from the cylinders, including a rotary valve concentric with the cylinder movement having a transverse passage for firing a non-adjacent cylinder from another, and means for actuating said valve in timed relation to the pistons.

7. A combustion engine having a controlled exhaust and comprising at least five rotatable cylinders, a valve between said cylinders and adjacent their head ends for controlling the supply of said cylinders, at least three cross firing ports spaced around the valve periphery, there being a less number of cross firing ports than cylinders, passages through the valve connecting said ports, and means for driving said valve at a different speed from said cylinders.

8. A combustion engine comprising rotating cylinders, pistons therein, driving connections for the pistons, a valve concentric with the cylinder movement for controlling operation of the cylinders, means for driving said valve at a different speed from said cylinders, but in timed relation thereto, and means including passages through said valve for firing a non-adjacent cylinder from a working cylinder.

9. A combustion engine comprising rotating cylinders, pistons therein, driving connections for the pistons, a valve concentric with the cylinder movement for controlling operation of the cylinders, means for driving said valve at a different speed from said cylinders, but in timed relation thereto, means including passages through said valve for firing a succeeding from a working cylinder, and means for adjusting the timing of said valve during rotation.

10. In a combustion engine, diverging rotatable cylinders each provided with a gas port and combustion space at the inner end, a valve between said cylinders and concentric with the cylinder movement, pistons in said cylinders, driving connections for the pistons, means to produce relative rotation between said cylinders and valve, a plurality of cross firing ports spaced around the valve periphery, and enlarged passages connecting said ports for firing a succeeding cylinder from a working cylinder.

11. A combustion engine comprising at least five diverging rotatable cylinders, a valve between said cylinders adjacent their head ends, at least three cross firing ports spaced around the valve, passages through the valve connecting said ports, and means for driving said valve at a different speed from said cylinders, at least three supply ports spaced around the valve, said supply and cross firing ports being arranged adjacent each other.

12. In a combustion engine, a plurality of cylinders having a gas port and combustion space at the adjacent ends, pistons in said cylinders, driving connections for said pistons, a combustion chamber between said cylinders, means to supply combustible material to said chamber, means passing a flame of combustible material successively to non-adjacent cylinders about to be fired from said chamber and means controlling the exhaust from said cylinders.

13. In a combustion engine, a rotor including diverging cylinders each having gas ports and combustion spaces at the inner ends, a piston in each cylinder, means for reciprocating the pistons during cylinder rotation, valve mechanism for controlling the passage of gas to and from the cylinders, including a rotary valve concentric with the cylinder movement having transverse passages for firing one cylinder from another, and shaped to fan out the cross fire flame, and means for actuating the valve in timed relation to the pistons.

14. In a combustion engine, a rotor including diverging cylinders each having gas ports and combustion spaces at the inner end, a piston in each cylinder, means of reciprocating the pistons during cylinder rotation, a valve mechanism for controlling the passage of gas to and from the cylinders, including a rotary valve concentric with the cylinder movement having a transverse passage for firing a succeeding from a working cylinder, such passage being intermediately enlarged, and means for driving the valve in timed relation to the pistons.

15. In a combustion engine, a rotor including diverging cylinders, each having a gas port and combustion space at the inner end, a piston in each cylinder, means for reciprocating the pistons during cylinder rotation, a valve mechanism for controlling the passage of gas to and from the cylinders, including a rotary valve concentric with the cylinder movement having a transverse passage therethrough walled on all sides by said valve for firing a succeeding from a working cylinder, and enlarged to prevent quenching the flame and further shaped to diverge the cross fire flame, and means for driving said valve in timed relation to the pistons.

16. In a combustion engine, a rotor including diverging cylinders each having a gas port and combustion space at the inner end, a piston in each cylinder, means for reciprocating the pistons during cylinder rotation, a rotary valve concentric with the cylinder movement and having a plurality of supply and exhaust ports arranged in pairs around the valve periphery, a passage through the valve connected to said supply ports, a second passage connected to said exhaust ports, and means for actuating said valve in timed relation to the pistons.

17. A combustion engine comprising a plurality of cylinders, a valve between said cylinders adjacent their head ends, cross firing ports spaced around the valve periphery for firing a succeeding from a working cylinder, passages through the valve connecting said ports, a plurality of separate supply and exhaust ports, a longitudinal passage through the valve connected to said supply ports, and a second longitudinal passage connected to said exhaust ports.

18. A combustion engine comprising diverging rotatable cylinders, a valve for controlling the supply and exhaust of the cylinders located between said cylinders adjacent their head ends, and concentric with cylinder movement, cross firing ports spaced around the valve periphery for firing a succeeding from a working cylinder, passages through said valve connecting said ports, means for driving said valve at a different speed from and in timed relation to said cylinders, and means for varying the timing of said valve during rotation thereof.

19. In a combustion engine, a rotor including diverging cylinders each having a gas port and combustion space at the inner end, a piston in each cylinder, means for reciprocating the pistons during cylinder rotation, valve mechanism for controlling the passage of gas to and from the cylinders, including a rotary valve concentric with the cylinder movement having a transverse passage for firing a succeeding cylinder from another, means for actuating said valve in timed relation to the pistons and the valve mechanism, and means for varying the timing of said valve.

20. In a combustion engine, a rotor including diverging cylinders each having a gas port and combustion space at the inner end, a piston in each cylinder, means for reciprocating the pistons during cylinder rotation, valve mechanism for controlling the passage of gas to and from the cylinders, including a rotary valve concentric with the cylinder movement having a transverse passage for firing one cylinder from a preceding, means for actuating said valve in timed relation to the pistons, and means for varying the timing of said valve while the engine is running.

21. In a combustion engine having a controlled exhaust, a rotor including diverging cylinders each having a gas port and combustion space at the inner end, a piston in each cylinder, means for reciprocating the pistons during cylinder rotation, a rotary valve concentric with the cylinder movement for controlling the admission of gas to the cylinders and for firing one cylinder from a non-adjacent cylinder in a different part of its cycle, and means for varying the timing of said valve.

22. In a combustion engine having a controlled exhaust, a rotor including diverging cylinders each having a gas port and combustion space at the inner end, a piston in each cylinder, means for reciprocating the pistons during cylinder rotation, a rotary valve concentric with the cylinder movement for controlling the admission of gas to the cylinders and for firing one cylinder from another, means for driving the valve in timed relation to the pistons, and means for varying the timing of said valve while the engine is running.

23. In a combustion engine, a rotor including diverging cylinders each having a gas port and combustion space at the inner end, a piston in each cylinder, means for reciprocating the pistons during cylinder rotation, a partially hollow shaft valve mechanism for controlling the passage of gas to and from the cylinders, including a rotary valve concentric with the cylinder movement and within the shaft having a firing chamber and peripheral ports connected therewith, means for charging said chamber with combustible gas, and spark ignition means in said firing chamber.

24. In a combustion engine, a plurality of cylinders having a gas port and combustion space at their adjacent ends, pistons in said cylinders, driving connections for said pistons, a combustion chamber equidistant between said cylinders, means for supplying combustible material to said chamber, and means for passing a flame of said combustible material successively to said cylinders from said chamber in timed relation with the pistons, and valve mechanism controlling the exhaust from said cylinders.

25. In a combustion engine, rotatable cylinders, a valve between said cylinders adjacent their head ends, means for driving the valve differentially with respect to and in timed relation to said cylinders, cross firing ports spaced around the valve for firing a succeeding from a working cylinder, an enlarged passage through the valve body connecting said ports, and a supply passage through said valve adjacent said cross firing passages.

26. In a combustion engine, a rotor including diverging cylinders each having a gas port and combustion space at the inner end, a piston in each cylinder, means for reciprocating the pistons during cylinder rotation, a valve concentric with the cylinder movement for controlling admission and exhaust of gas to and from the cylinders, a longitudinal supply passage leading to the valve from one direction and a longitudinal exhaust passage leading from the valve in the opposite direction, and transverse cross firing passages between said longitudinal passages for firing a succeeding from a working cylinder.

27. In a combustion engine, a rotor including a unitary casting having diverging cylinders each having a gas port and combustion space at the inner end, and being cored to provide a cooling jacket around each cylinder, a shaft on which said casting is fixed for rotation, ports in said shaft leading to each cylinder, additional shaft ports leading to said jackets, a valve within said shaft controlling said cylinder ports, cooling passages inside said shaft, means for driving said valve in timed relation to said cylinders, and means for supplying and removing cooling fluid for said cooling passages and jackets.

28. In a combustion engine, a rotor including a unitary casting having diverging cylinders each having a gas port and combustion space at the inner end, and being cored to provide a cooling jacket around each cylinder, a shaft on which said casting is fixed for rotation, ports in said shaft leading to each cylinder and additional shaft ports leading to said jackets, means controlling the supply and removal of cooling fluid for said jackets, and means controlling the supply and exhaust of said cylinders.

29. In a combustion engine, a rotor including a plurality of diverging cylinders each having a gas port and combustion space at the inner end, a piston in each cylinder, means for reciprocating the pistons during cylinder rotation, a valve concentric with the cylinder movement for controlling admission and exhaust of gas to and from the cylinders, a longitudinal supply passage leading to the valve from one direction and a longitudinal exhaust passage leading from the valve in the opposite direction, transverse cross firing passages between said longitudinal passages, an electric ignition means in said cross firing passages, and an electrical conductor leading through one of said longitudinal passages to said ignition means.

30. In a combustion engine, a rotor including a plurality of diverging cylinders each having a gas port and combustion space at the inner end, a piston in each cylinder, means for reciprocating the pistons during cylinder rotation, a rotary valve concentric with the cylinder movement for controlling the admission of gas to the cylinders, means for driving said valve in timed relation to the cylinders, means for varying the timing of said valve, a tube between said valve and its driving means and provided with an interior recess, a hole leading from said recess to the periphery of said tube, and a helical groove thereon leading from said hole to the outer surface of said valve for lubricating the same, and means controlling the exhaust from the cylinders.

31. In a combustion engine, a plurality of cylinders provided with a gas port and combustion space at the inner end of each cylinder, a valve between said cylinders and concentric with cylinder movement for controlling the supply and exhaust of the cylinders, pistons in said cylinders, driving connections for the pistons, means to produce relative rotation between said cylinders and valve, a less number of cross firing ports than cylinders spaced around the valve and passages connecting said ports for firing a succeeding from a working cylinder.

32. In a combustion engine, a rotor including diverging cylinders each having a gas port and combustion space at an inner end, a piston in each cylinder, means for reciprocating the pistons during cylinder rotation, a rotary valve concentric with the cylinder movement having a plurality of separate supply and exhaust ports each less in number than the cylinders, supply and exhaust passages through said valve connecting said ports, at least as many cross firing ports as supply ports on said valve, and means for actuating the valve in timed relation to the pistons.

33. In a combustion engine, a rotor including diverging cylinders each having a gas port and combustion space at an inner end, a piston in each cylinder, means for reciprocating the pistons during cylinder rotation, a rotary valve concentric with the cylinder movement having a plurality of separate supply and exhaust ports each less in number than the cylinders, supply and exhaust passages through said valve connecting said ports, at least as many cross firing ports as supply ports on said valve, there being a supply port, exhaust port, cross firing port, supply port, etc., around the valve, arranged successively around the valve periphery in the direction of rotation of the valve, and means for actuating the valve in timed relation to the pistons.

34. In a combustion engine, rotatable cylinders, a valve concentric with the cylinder movement, ports on said valve to fire a succeeding from a working cylinder, an enlarged passage through said valve connecting said ports, entirely walled in by said valve, and shaped to prevent quenching the cross fire flame.

35. In a combustion engine, a rotor including cylinders, a piston in each cylinder, means for reciprocating the pistons, a partially hollow shaft, a rotary valve within said shaft between said cylinders having therein separate supply and exhaust passages, means for rotating the valve in timed relation to the cylinders, and means for adjusting the timing of the valve during its rotation.

36. In a combustion engine, a plurality of cylinders, a piston in each cylinder, means for reciprocating the pistons, means including a passage having a restricted portion and extending between non-adjacent cylinders for gradually bending a cross-fire flame between a firing and a succeeding cylinder, the said passage being substantially continuously heated, and means for adjusting the timing of flame transfer.

37. In a combustion engine, a plurality of cylinders, a piston in each cylinder, means for reciprocating the pistons, a partially hollow, ported, rotating shaft, a rotary valve within said shaft having therein supply and exhaust ports, and means for driving the valve in timed relation to the pistons.

Signed at New Bloomfield, in the county of Perry and State of Pennsylvania.

WILLIAM HARPER, Jr.